Figure 1:
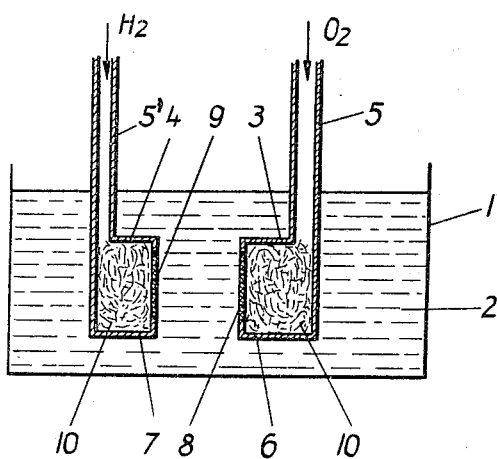

INVENTORS:
HANNS H. KROEGER and MARGARETE JUNG

By Erich M.H. Radde

AGENT 3,328,206
CATALYTIC ELECTRODE FOR FUEL CELLS AND METHOD FOR ITS MANUFACTURE
Hanns H. Kroeger, Frankfurt am Main, and Margarete Jung, Nieder-Eschbach, Germany, assignors to Varta Aktiengesellschaft, Hagen, Westphalia, Germany, a corporation of Germany
Filed May 23, 1961, Ser. No. 112,015
Claims priority, application Germany, May 31, 1960, A 34,781
14 Claims. (Cl. 136—120)

The present invention relates to improvements in electro-chemical devices known as fuel cells, and more particularly to catalytic electrodes for fuel cells and their manufacture.

Catalytically active electrodes for fuel cells are known. They may comprise porous metallic sintered bodies, for instance, of nickel powder. It has been proposed to increase the catalytic activity of such electrodes by impregnating the porous body with a catalytically active substance. Porous carbonaceous bodies have also been used as carriers for catalytically active substances in fuel cell electrodes.

It is a common disadvantage of the conventional fuel cell electrodes that the catalytically active substances, usually metals, are precipitated into their porous carriers in the form of relatively compact agglomerates. This causes the catalytic activity in the electrode to be concentrated in relatively few centers and correspondingly decreases the capacity of the electrodes.

It is the primary object of the present invention to overcome this disadvantage and to provide fuel cell electrodes with finely divided and widely distributed catalytically active substances, which produces an optimum catalytic effect.

The above and other objects are accomplished in accordance with this invention by providing an ion exchange carrier for the catalytically active substance or substances, such as metals, of a fuel cell electrode.

The ion exchange carrier may be a cation exchange resin. It may also be a porous body, such as a carbonaceous or sintered metallic body, which has been converted into a cation exchanger by adding active functional groups to it that give the body the property of combining with or exchanging ions between the body and a solution.

In one embodiment of the invention, the cation exchanger may be loosely poured in the form of a powder or of granules into a perforated metallic or non-conductive container, such as a sieve or net, which is permeable to the electrolyte.

Fuel cell electrodes are prepared according to this invention by passing a solution of a salt of one or more catalytically active metals through a carrier body which consists of a cation exchanger or contains active groups imparting cation exchange properties thereto, whereby the hydrogen ions of the cation exchanger are replaced by the metallic ions. These metallic ions in the ion exchanger are then reduced to the metal by conventional methods. In this manner, the catalytically active metals are contained in the carrier in almost atomic distribution so that their catalytic activity may be developed to an optimum degree. Therefore, even very small amounts of metal produce a very considerable catalytic effect.

Active functional groups may be incorporated into porous bodies by impregnating the same with a monomer which is subsequently polymerized or condensed and provided with the active groups. If desired, the monomer may contain the functional group before incorporation into the porous body and before polymerization or condensation is effected. The carrier may also be produced from a mixture of powdered or granulated metallic or carbonaceous materials and such a monomer. Said mixture is either loosely placed into an electrolyte-permeable container or converted into a solid porous body.

In accordance with another embodiment of the present invention, the catalytically active electrode may comprise a membrane of an ion exchange carrier having only one portion provided with metallic ions while the other part of the carrier has only ionic conductivity after the metallic ions have been reduced to metal. This other part may then take over the function of the electrolyte.

By using suitable catalytically active substances, the electrodes of this invention may form cathodes as well as anodes of fuel cells. For the cathode or positive electrode, platinum and silver are preferred catalytically active metals. Platinum, palladium, or nickel are preferred as catalytically active metals for the anode or negative electrode of fuel cells.

Figure 2:
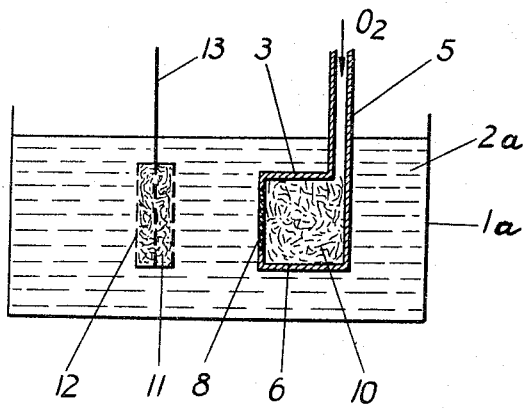

The above and other objects, advantages and features of the present invention will become more apparent in the following detailed description of certain embodiments thereof, as illustrated in the specific examples and in the accompanying drawing wherein FIG. 1 is a schematic sectional side view of a conventional fuel cell incorporating the invention and FIG. 2 is a similar view of another type of fuel cell.

Referring now to the drawing and first to FIG. 1, there is shown a fuel cell container 1 of any suitable alkali-resistant material. The container material may be a synthetic resin, such as polyethylene or polystyrene. The container holds the electrolyte 2 which consists of 6 N potassium hydroxide solution. The fuel electrode 4 and the oxygen electrode 3 are immersed in the electrolyte, conduits 5 and 5' being connected to the respective electrodes to convey hydrogen gas to the negative electrode 4 and oxygen gas to the positive electrode 3. The conduits, which preferably consist of nickel, have widened end portions 6 and 7 which hold the electrodes proper and simultaneously serve as current conductors from the electrodes. The open ends of the widened conduit portions 6 and 7 are closed by membranes 8 and 9, respectively. The membranes consist of an ion exchange carrier containing catalytically active metal ions which is platinum in the case of membrane 9 and silver in the case of membrane 8. The widened portions between the conduits 5 and 5' and the membranes 8 and 9 are filled with silver wool 10.

Such a fuel cell may be operated at room temperatures and under a pressure of 0.1–0.3 atm. gauge with 50 ma./sq. cm., and delivers a voltage of 0.8 v.

The same voltage is delivered if the cell is operated under the same pressure conditions but at 40° C. and with a charge of 100 ma./sq. cm.

The fuel cell of FIG. 2 operates with a liquid fuel which is dissolved in the electrolyte. The fuel cell container 1a is similar to that of FIG. 1 and holds an electrolyte 2a consisting of a mixture of 6 N potassium hydroxide solution and 2 moles/liter of glycol. The oxygen electrode 3 is identical with that of FIG. 1 and its parts are designated, therefore, with identical reference numerals. The fuel electrode comprises a perforated metallic container 12, preferably a nickel sieve, loosely filled with a granular material 11 consisting of the ion exchange carrier and catalytically active metal of the present invention. A nickel sheet 13 serves as the current conductor of the fuel electrode.

Useful ion exchangers for the carriers of this invention include organic cation exchange substances of sufficient mechanical strength, having a small electrical resistance of the order of 5.6–20/ohm/sq. cm., a high exchange capacity of the order of 1–4.5 milli-equivalent/cu. cm., and being substantially inert to alkali, hydrogen, oxygen, and mono- and polyvalent alcohols.

Suitable cation exchange substances of this type include phenolic resins with an acitve sulfonic acid group, as they are sold, for instance, under the trademarks Levatit PN and Levatit KSN by Farbenfabrik Bayer, Germany, Wofatit F, Wofatit P, and Wofatit D by VEB Farbenfabrik Wolfen, East Germany, Durolite C3 by Chemical Process Co., and others. Also, polystyrene base resins with an active sulfonic group, as they are sold by Rohm & Haas Co. under the trademark Amberlite IR series of cation exchange resins; by Farbenfabrik Bayer, Germany, under the trademark Levatit S 100; by VEB Farbenfabrik Wolfen, Germany, under the trademark Wofatit KPS 200; and by Permutit Co. under the trademarks Permutit Q and Permutit RS. Furthermore, acrylic acid resins with active carboxylic groups, as they are sold by Rohm & Haas Co. under the trademark Amberlite IRC 50; by Permutit Co. under the trademarks Permutit H 70, Permutit C, and Zeokarb 226; by VEB Farbenfabrik Wolfen under the trademark Wofatit CP 300, and others.

The following specific examples will illustrate certain embodiments of the present invention without, however, restricting the same thereto.

*Example 1*

A polystyrene divinyl benzene sulfonate film of 0.11 mm. thickness, commercially sold under the trademark "Nalfilm 3," by Nalco Chemical Co., Chicago, was soaked in water for 24 hours. The swollen film was then immersed for about half an hour to about one hour in a 2% potassium chloride solution to distribute potassium ions throughout the film. The cation exchange carrier film was then regenerated by passing a 5% aqueous solution of hydrochloric acid (or a sulfuric acid) therethrough for a period of one hour to two hours. The film prepared in this manner was then immersed in a 1% chloro platinic acid solution for about 30 minutes to 60 minutes to distribute platinum ions throughout the film.

The platinum ions were reduced to metallic platinum in the film in the following manner:

The film was suspended in a flask with a wide neck, which was filled to one fifth of its volume with formic acid. Hydrogen was introduced into the flask and the formic acid was brought to the boiling point which causes the decomposition of the bond between the ion exchange carrier and the platinum ions as well as the reduction to metallic platinum.

The resultant membrane was used at 9 in the anode of the fuel cell of FIG. 1. At the above-described operation of the cell at room temperature, it showed only little polarization.

*Example 2*

A carbonaceous porous body was produced from a carbon body having an average pore diameter of 10–100 Angstrom, preferably about 20–40 Angstrom, and an internal surface of 10–50 sq. m./g., preferably 10–30 sq. m./g. This carbon body was heated to a temperature of 650° C. and then rapidly quenched at a temperature as low as 50° C. This heating and subsequent rapid quenching was repeated several times until the pore volume of the body was about 40%.

This porous carbonaceous body was treated for six hours with a 25% solution of chloro sulfonic acid in carbon tetrachloride containing 20% free sulfur trioxide. The treated body was then washed with water until the wash water was neutral.

The resultant cation exchange carrier was then loaded with palladium ions by impregnation with palladium chloride and the palladium ions were reduced to metallic palladium in a hydrogenation stream at 80° C. in a conventional manner.

When used as a negative electrode in a fuel cell, this body showed excellent electrochemical properties. The electrode could sustain a high load and could be operated as fuel electrode at room temperature or at temperatures up to 70° C. It was also useful as a negative electrode in a cell using a liquid fuel, such as element 12 in FIG. 2.

*Example 3*

A porous carbonaceous body having a pore volume of about 30% was impregnated with monomeric styrene containing 3.5%, by weight, of divinyl benzene and 1.5%, by weight, of benzoyl peroxide. This impregnant was polymerized in the body by heating it to a temperature of 65° C. for 30 minutes. Subsequent sulfonation and washing was effected as in Example 2 and the resultant cation exchange carrier was then immersed in a 5% silver nitrate solution to distribute silver ions throughout its structure. The silver ions were reduced to metallic silver by the action of formaldehyde in a conventional manner.

When this body was used as positive electrode in a fuel cell, the cell could be permanently operated with a load of 75 ma./sq. cm.

*Example 4*

A positive electrode was produced in accordance with Example 3 but the compounds with which the porous carbonaceous body was impregnated in place of styrene, were sodium phenolate, sodium sulfite, and formaldehyde. Heating of the thus impregnated body up to 40° C. for 30 minutes produced the cation exchange resin sold under the trademark Wofatit P, uniformly distributed therethrough.

*Example 5*

A positive electrode was produced in accordance with Example 3 but the compounds, with which the porous carbonaceous body was impregnated in place of styrene were benzaldehyde-2,4-sulfonic acid, resorcinol, formaldehyde, and sodium hydroxide solution. Heating of the thus impregnated body up to 40° C. for 30 minutes produced the cation exchange resin sold under the trademark Wofatit K or Wofatit KS, uniformly distributed therethrough.

*Example 6*

50 g. of potassium p-styrene sulfonate was dissolved in 100 g. of dimethylformamide and 2.5% of divinyl benzene and 1% of benzoylperoxide, both based on the weight of the solution, were added thereto. A highly porous sintered body of V4A-steel, as sold by the Deutsche Edelstahlwerke in Stuttgart, Germany, and having a porosity of 45% was impregnated with this solution, which was then polymerized for 12 hours at a temperature of 60° C. to obtain an ion exchange carrier. The ion exchanger was regenerated by a treatment with a 3% solution of nitric acid and then loaded with palladium ions which were reduced to metallic palladium by means of a 40% formaldehyde solution.

The resultant body was found highly useful as a negative electrode in a fuel cell.

*Example 7*

A 50% sulfonated polystyrene powder was intimately mixed with 10%, by weight, of ammonium carbonate. The mixture was molded into a porous electrode carrier at a temperature of 150° C. The resultant ion exchange carrier, the porosity of which was increased by the decomposition of the ammonium carbonate during the molding, was then prepared in the manner of Example 1 to produce an anode for a fuel cell.

*Example 8*

An ion exchange carrier for catalytically active metal of a fuel cell electrode was prepared from 50% sulfonated polystyrene powder intimately mixed with 10%, by weight, of potassium chloride, which mixture was molded into an electrode carrier at a temperature of 170° C. The molded carrier body was then washed with water at a temperature of 80° C. until no more chlorine ions were found in the wash water. The resulting electrode body is impregnated with the ions of the catalytically active metal which is reduced to the metal as described in Examples 1 to 3 and yields a highly effective electrode for fuel cells.

*Example 9*

A highly porous ion exchange carrier for catalytically active metal of a fuel cell electrode was prepared from 50% sulfonated polystyrene intimately mixed with 10%, by weight, of benzoyl peroxide. When molded at a temperature of 160° C., this mixture produces a sponge-like body of such high porosity that it has three to five times the volume of the starting material.

*Example 10*

A membrane of Permaplex C 10, as produced by the Permutit Company, London, of a thickness of about 2 mm. was swollen in water for 24 hours, then treated by a 2% aqueous solution of potassium chloride, regenerated by a 5% aqueous solution of hydrochloric acid, and washed by distilled water until the washing water was free from chloride ions.

One side of the membrane was then brushed with a 1% aqueous solution of chloro platinic acid for 5 minutes and treated with vapor of formic acid whereby the platinum ions were reduced to platinum metal.

The thus produced membrane contained platinum metal throughout about 50% of its volume.

In place of hydrogen, used as gaseous fuel in fuel cells according to the present invention, there may be employed propane or carbon monoxide, while as liquid fuels there may be used alcohols, such as glycerine, or methyl alcohol. Of course, the present invention is not limited to the fuels mentioned.

While the invention has been described in connection with certain preferred and useful embodiments, it will be clearly understood that many modifications and variations may occur to the skilled in the art, particularly after benefiting from the present teaching, without departing from the spirit and scope of this invention as defined in the appended claims.

We claim:

1. The method of preparing a catalytically active fuel cell electrode, comprising the steps of passing a solution of a salt of a catalytically active metal through at least a portion of a cation exchange carrier body to distribute metallic ions throughout said portion and reducing the metallic ions attached to the cation exchange carrier body, to the corresponding metal without adversely affecting the carrier body.

2. The method of preparing a catalytically active fuel cell electrode, comprising the steps of distributing active cation exchange groups throughout a porous body, impregnating the thus obtained porous cation exchange body with a solution of a salt of a catalytically active metal to distribute metallic ions throughout said body, and reducing the metallic ions attached to the cation exchange carrier body, to the corresponding metal without adversely affecting the carrier body.

3. The method of claim 2, wherein said cation exchange groups are sulfonic acid groups.

4. The method of claim 2, wherein said porous body is a carbonaceous body.

5. The method of claim 2, wherein said porous body is a sintered metallic body.

6. The method of claim 2, wherein the cation exchange groups are distributed throughout the porous body by impregnating the body with a cation exchange resin-forming monomer selected from the group consisting of a polymerizable monomer and a polycondensable monomer, and a substance containing an active cation exchange group, and converting said monomer and substance into a cation exchange resin.

7. The method of preparing a catalytically active fuel cell electrode, comprising the steps of impregnating a granular cation exchange resin with a solution of a salt of a catalytically active metal to distribute metallic ions throughout said resin, reducing the metallic ions, attached to cation exchange carrier body, to the corresponding metal without adversely affecting the carrier body, and placing the granular cation exchange resin carrying the metal into a perforated container.

8. The method of preparing a catalytically active fuel cell electrode, comprising the steps of adding a pore-forming substance to a granular cation exchanger, removing the pore-forming substance to produce a porous body, impregnating the thus obtained porous cation exchange body with a solution of a salt of a catalytically active metal to distribute metallic ions throughout said body, and reducing the metallic ions, attached to the cation exchange carrier body, to the corresponding metal without adversely affecting the carrier body.

9. The method of claim 8, wherein the pore-forming substance is potassium chloride.

10. The method of claim 8, wherein the pore-forming substance is ammonium carbonate.

11. The method of preparing a catalytically active fuel cell electrode, comprising the steps of mixing a microporous material with a cation exchange resin-forming monomer selected from the group consisting of a polymerizable monomer and a polycondensable monomer, converting the monomer to a resin, distributing active cation exchange groups throughout the resin, making a porous body of said cation exchange resin, impregnating the thus obtained porous cation exchange body with a solution of a salt of a catalytically active metal to distribute metallic ions throughout said body, and reducing the metallic ions, attached to the cation exchange carrier body, to the corresponding metal without adversely affecting the carrier body.

12. The method of preparing a catalytically active fuel cell electrode, comprising the steps of mixing a microporous material with a cation exchange resin-forming monomer selected from the group consisting of a polymerizable monomer and a polycondensable monomer, said monomer containing active cation exchange groups, converting the monomer to a cation exchange resin, making a porous body of said resin, impregnating the thus obtained porous cation exchange body with a solution of a salt of a catalytically active metal to distribute metallic ions throughout said body, and reducing the metallic ions, attached to the cation exchange carrier body, to the corresponding metal without adversely affecting the carrier body.

13. The method of preparing a catalytically active fuel cell electrode comprising the steps of admixing a water soluble pore-forming compound to a cation exchange resin body, passing an aqueous solution therethrough to dissolve the pore-forming compound and to produce a porous body, impregnating the thus obtained porous cation exchange body with a solution of a salt of a catalytically active metal to distribute metallic ions throughout said body, and reducing the metallic ions, attached to the cation exchange carrier body, to the corresponding metal.

14. The method of preparing a catalytically active fuel cell electrode, comprising the steps of admixing an acid soluble pore-forming compound to a cation exchange resin body, passing an aqueous solution of an acid therethrough to dissolve the pore-forming compound and to produce a porous body, impregnating the thus obtained porous cation exchange body with a solution of a salt of a catalytically active metal to distribute metallic ions throughout said body, and reducing the metallic ions, attached to the cation exchange carrier body, to the corresponding metal.

References Cited

UNITED STATES PATENTS

| | | | |
|---|---|---|---|
| 1,988,661 | 1/1935 | Thorausch | 136—28 |
| 2,283,883 | 5/1942 | Conconi | 117—123 |

(Other references on following page)

| | | | |
|---|---|---|---|
| 2,708,683 | 5/1955 | Eisen | 136—19 |
| 2,737,541 | 3/1956 | Coolidge | 136—20 |
| 2,860,175 | 11/1958 | Justi | 136—120 |
| 2,935,547 | 5/1960 | Kordesch | 136—86 |
| 2,952,643 | 9/1960 | Voge | 252—430 |
| 2,963,447 | 12/1960 | Peters et al. | 252—430 |
| 2,977,401 | 3/1961 | Morsal et al. | 136—120 |
| 3,012,937 | 12/1961 | Schlichting | 260—2.2 |
| 3,032,600 | 5/1962 | Mayer | 136—6 |
| 3,085,072 | 4/1963 | Zima | 260—2.2 |
| 3,097,116 | 7/1963 | Moos | 136—120 |
| 3,099,608 | 7/1963 | Radovsky et al. | 204—20 |

WINSTON A. DOUGLAS, *Primary Examiner.*

JOHN R. SPECK, JOHN H. MACK, *Examiners.*

C. B. PARKER, H. FEELEY, *Assistant Examiners.*